United States Patent
Bryan et al.

(10) Patent No.: US 10,359,282 B2
(45) Date of Patent: Jul. 23, 2019

(54) SHELF HEIGHT INDICATION AND VALIDATION DEVICE

(71) Applicant: Walmart Apollo, LLC, Bentonville, AR (US)

(72) Inventors: Greg A. Bryan, Centerton, AR (US); Benjamin D. Enssle, Bella Vista, AR (US); David B. Brightwell, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/997,423

(22) Filed: Jun. 4, 2018

(65) Prior Publication Data
US 2018/0283863 A1 Oct. 4, 2018

Related U.S. Application Data

(62) Division of application No. 15/481,687, filed on Apr. 7, 2017, now Pat. No. 10,024,662.
(Continued)

(51) Int. Cl.
*H04N 9/47* (2006.01)
*G01C 15/00* (2006.01)
(Continued)

(52) U.S. Cl.
CPC ........ *G01C 15/004* (2013.01); *A47B 47/0075* (2013.01); *A47B 47/0091* (2013.01);
(Continued)

(58) Field of Classification Search
CPC ... G01C 15/004; A47B 47/0075; A47B 57/34; A47B 97/00; A47B 47/0091;
(Continued)

(56) References Cited

U.S. PATENT DOCUMENTS

| | | |
|---|---|---|
| 2,053,810 A | 9/1936 | Bisel |
| 4,811,670 A | 3/1989 | Kolvites |

(Continued)

FOREIGN PATENT DOCUMENTS

JP H10155567 6/1998

OTHER PUBLICATIONS

Amazon; C.K. T3510 Folding Wooden Rule; http://www.amazon.co.uk/dp/B003WOZS5S/?tag=1eprice053-21&SubscriptionId=AKIAJU65XXVJAEFAZH3Q; Jan. 27, 2016; 4 pages.
(Continued)

*Primary Examiner* — Richard T Torrente
(74) *Attorney, Agent, or Firm* — Fitch, Even, Tabin & Flannery LLP

(57) ABSTRACT

In some embodiments, apparatuses and methods are provided herein useful to quickly and accurately determine shelf notch height for a shelving unit. This is particularly advantageous to determine whether shelves in the shelving unit were installed at the correct height and/or for installing shelves at desired heights. In some embodiments, a measurement member is provided with a bottom offset and shelf notch indicator portions. A horizontal position indicator can then be aligned with a desired shelf notch indicator portion and project outwardly therefrom towards a shelving unit to provide a visual indication of the height of a desired shelf notch.

2 Claims, 7 Drawing Sheets

Related U.S. Application Data

(60) Provisional application No. 62/319,446, filed on Apr. 7, 2016.

(51) Int. Cl.

| | |
|---|---|
| *A47B 47/00* | (2006.01) |
| *A47B 57/34* | (2006.01) |
| *A47B 97/00* | (2006.01) |
| *B25J 5/00* | (2006.01) |
| *B25J 9/16* | (2006.01) |
| *G01B 3/06* | (2006.01) |
| *G01B 5/06* | (2006.01) |
| *H04N 7/18* | (2006.01) |
| *H04N 9/31* | (2006.01) |
| *G01B 11/06* | (2006.01) |
| *A47F 10/00* | (2006.01) |
| *A47F 5/10* | (2006.01) |

(52) U.S. Cl.
CPC .............. *A47B 57/34* (2013.01); *A47B 97/00* (2013.01); *A47F 10/00* (2013.01); *B25J 5/00* (2013.01); *B25J 9/1679* (2013.01); *G01B 3/06* (2013.01); *G01B 5/061* (2013.01); *G01B 11/0608* (2013.01); *H04N 7/183* (2013.01); *H04N 9/3179* (2013.01); *A47F 5/103* (2013.01); *Y10S 901/01* (2013.01)

(58) Field of Classification Search
CPC ........... B25J 9/1679; B25J 5/00; G01B 5/061; G01B 11/0608; G01B 3/06; H04N 9/3179; H04N 7/183; A47F 5/103; A47F 10/00; Y10S 901/01
USPC ......................................................... 348/91
See application file for complete search history.

(56) References Cited

U.S. PATENT DOCUMENTS

| | | | |
|---|---|---|---|
| 6,003,235 | A | 12/1999 | Chen |
| 6,128,824 | A | 10/2000 | Yang |
| 7,891,106 | B2 | 2/2011 | Dunham |
| 8,572,856 | B1 | 11/2013 | Vannoy |
| 1,002,466 | A1 | 7/2018 | Bryan |
| 2008/0180847 | A1 | 7/2008 | Brooks |
| 2012/0031867 | A1* | 2/2012 | Weyler .................. A47B 46/00 211/153 |
| 2015/0363758 | A1* | 12/2015 | Wu ...................... G06Q 20/201 705/20 |

OTHER PUBLICATIONS

Amazon; LimoStudio 48 inch Scale Video Stabilization System DSLR Camera Dolly Track Motion Slider, AGG1568; http://www.amazon.com/LimoStudio-Stabilization-System-Camera-AGG1568/dp/B00T8OGZSA; Jan. 27, 2016; 6 pages.

Builder Depot; Stabila Zp-M Target Plate With Folding Rule 7428; http://www.builderdepot.co.uk/stabila-zp-m-target-plate-with-folding-rule-7428.html; Jan. 27, 2016; 1 page.

Enlance IHPR; "Height Measurement"; https://www.youtube.com/watch?v=BeqOkMj1728; published on Aug. 11, 2013; 4 pages.

PCT; App. No. PCT/US2017/026540; International Search Report and Written Opinion dated Sep. 5, 2017.

Pulse TV; "Selfie Stick with Built-In Button"; https://www.youtube.com/watch?v=z5kyCEimnaY; published on Apr. 7, 2015; 6 pages.

USPTO; U.S. Appl. No. 15/481,687; Notice of Allowance dated Mar. 23, 2018.

\* cited by examiner

SHELF HEIGHT INDICATION AND VALIDATION DEVICE

CROSS-REFERENCE TO RELATED APPLICATIONS

This application is a divisional of U.S. application Ser. No. 15/481,687, filed Apr. 7, 2017, which claims the benefit of U.S. Provisional Application No. 62/319,446, filed Apr. 7, 2016, which is hereby incorporated by reference herein in its entirety.

TECHNICAL FIELD

This invention relates generally to modular shelving and, more particularly, to tools for modular shelving.

BACKGROUND

Retail stores often utilize modular shelving units to display products for sale. These modular shelving units can include notches along the height of back plate to mount shelves at desired heights. In many cases, a retail store has a plan setting out specific height locations for each shelf of the modular display units. A worker installing the shelves, however, may not follow the plan due to simple error or based on getting easier access to the products on the shelves, for example. These revisions to the plan can result in non-uniform display that detract from the overall appearance of an aisle and can potentially cause the modular shelving unit height to exceed a maximum. Determining whether a modular shelving unit was installed according to the plan, however, can be a difficult and timely process.

BRIEF DESCRIPTION OF THE DRAWINGS

Disclosed herein are embodiments of systems, apparatuses and methods pertaining to determining shelf height in a modular shelving unit. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/ or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to quickly and accurately determine shelf notch height for a modular shelving unit. This is particularly advantageous to determine whether shelves in the shelving unit were installed at the correct height and/or for installing shelves at desired heights.

Figure 1:
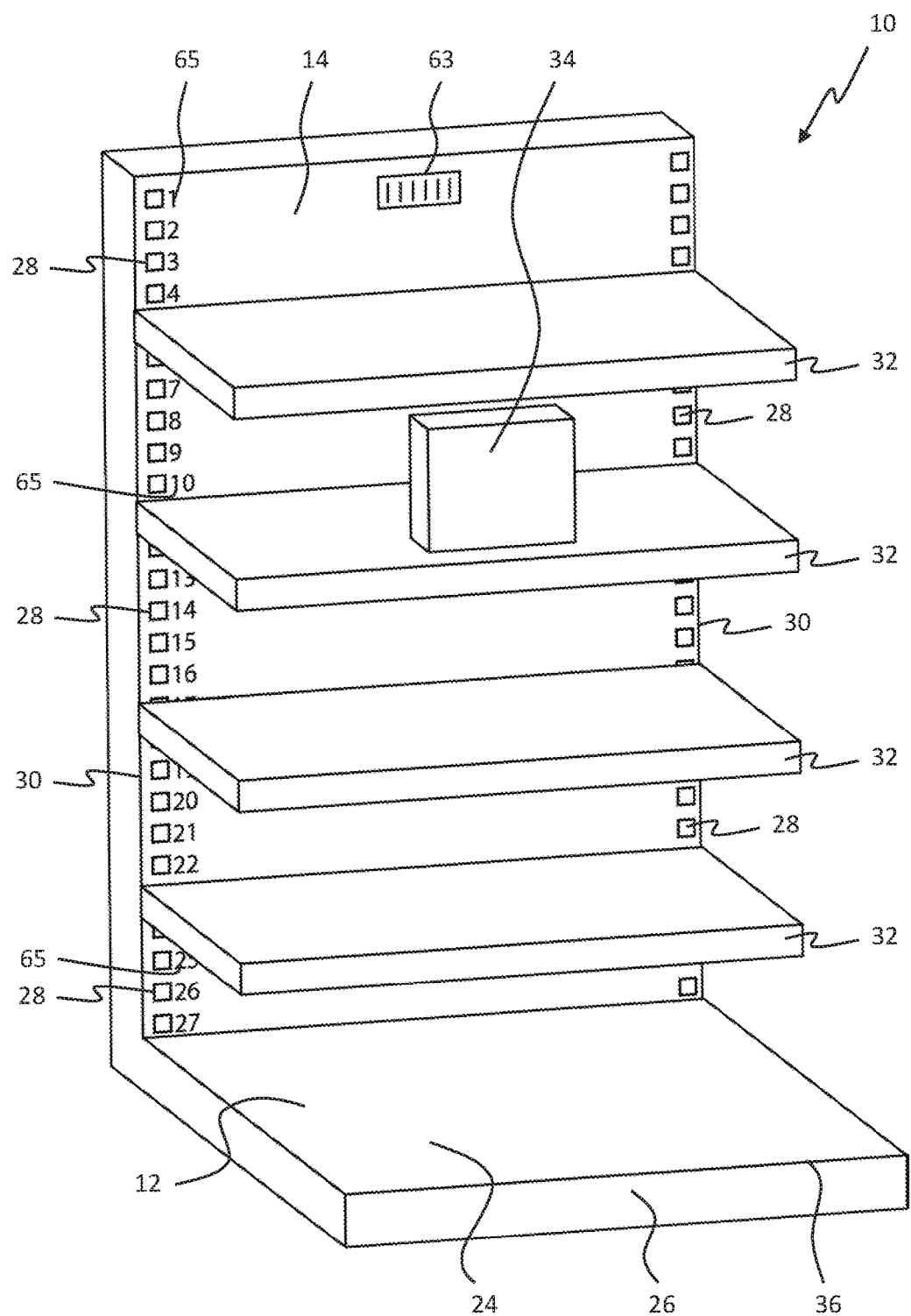
FIG. 1 is a modular shelving unit in accordance with some embodiments.

A modular shelving unit 10 is shown in FIG. 1. Based on a particular use, multiple shelving units 10 can be aligned in a row to produce an aisle in a retail location. The shelving unit 10 includes a base portion 12 and a back wall 14 extending upwardly therefrom. The base portion 12 can include a base deck 24 and a kick plate 26, as commonly configured. A plurality of shelf notches 28 are vertically disposed adjacent to lateral edges 30 of the back wall 14 to provide anchor points for shelves 32 mounted to the shelving unit 10. The shelf notches 28 can be incorporated into the back wall 14 or can be provided by a separate strip or plate mounted to the back wall 14 as desired. As shown in FIG. 1, the shelf notches 28 begin at a height above the base portion 12. As such, the shelf notches 28 cannot be easily identified by traditional measuring sticks or tape measures. Instead, a user is forced to manually count to determine a desired shelf notch, which can easily lead to mistakes. Instead of following a preset plan as to the desired height of the shelves on the shelving unit 10, a user may use a product 34 that is intended for the shelf to set the shelf height at a convenient location above the product 34. This practice, however, can undesirably lead to shelves 32 being mounted to shelf notches 28 that are not identified in the preset plan. Additionally, due to the location of the shelf notches 28 along the back wall 14, it can be difficult for a user to subsequently check the height of shelves 32 already mounted to the shelving unit 10, especially due to the height of the base portion 12.

Figure 2:
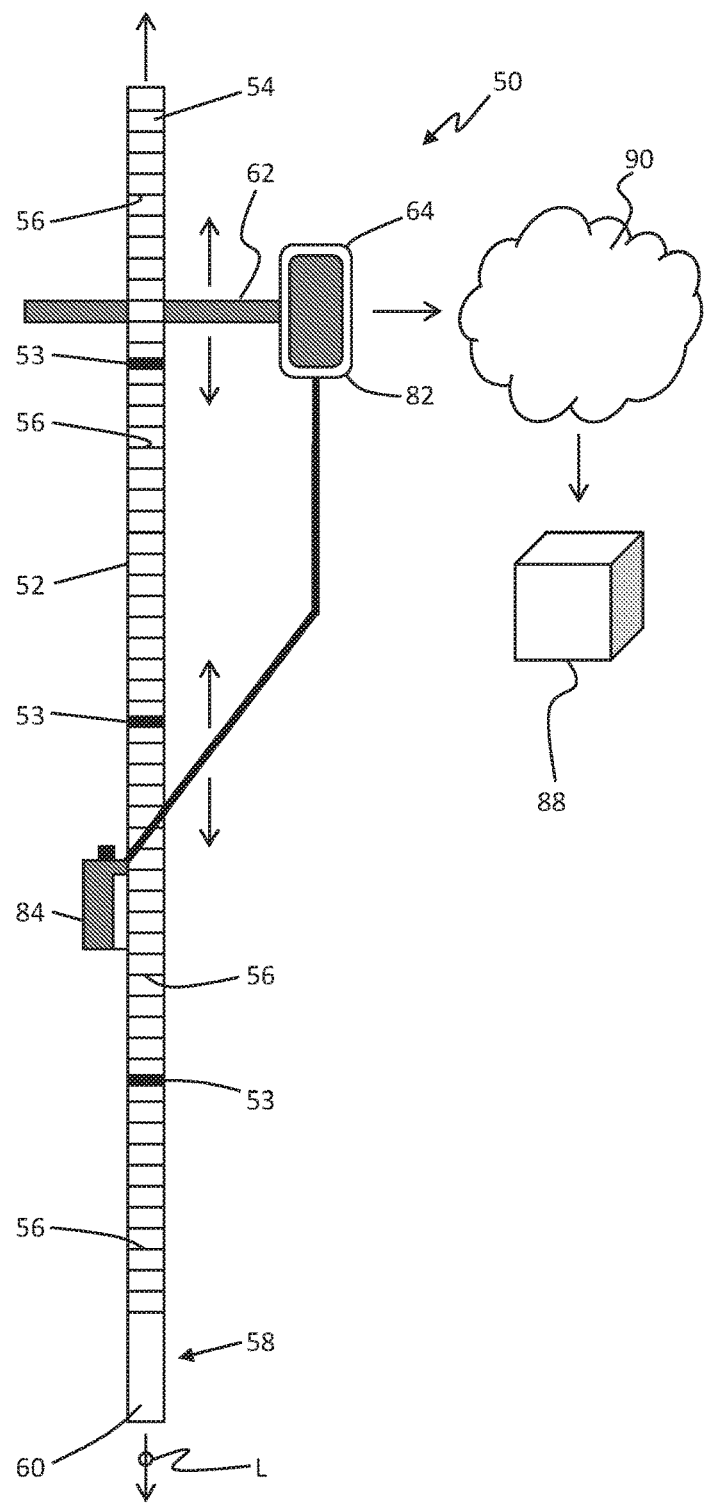
FIG. 2 is a diagrammatic view of a first embodiment of a shelf height measurement device in accordance with several embodiments.
Figure 3:
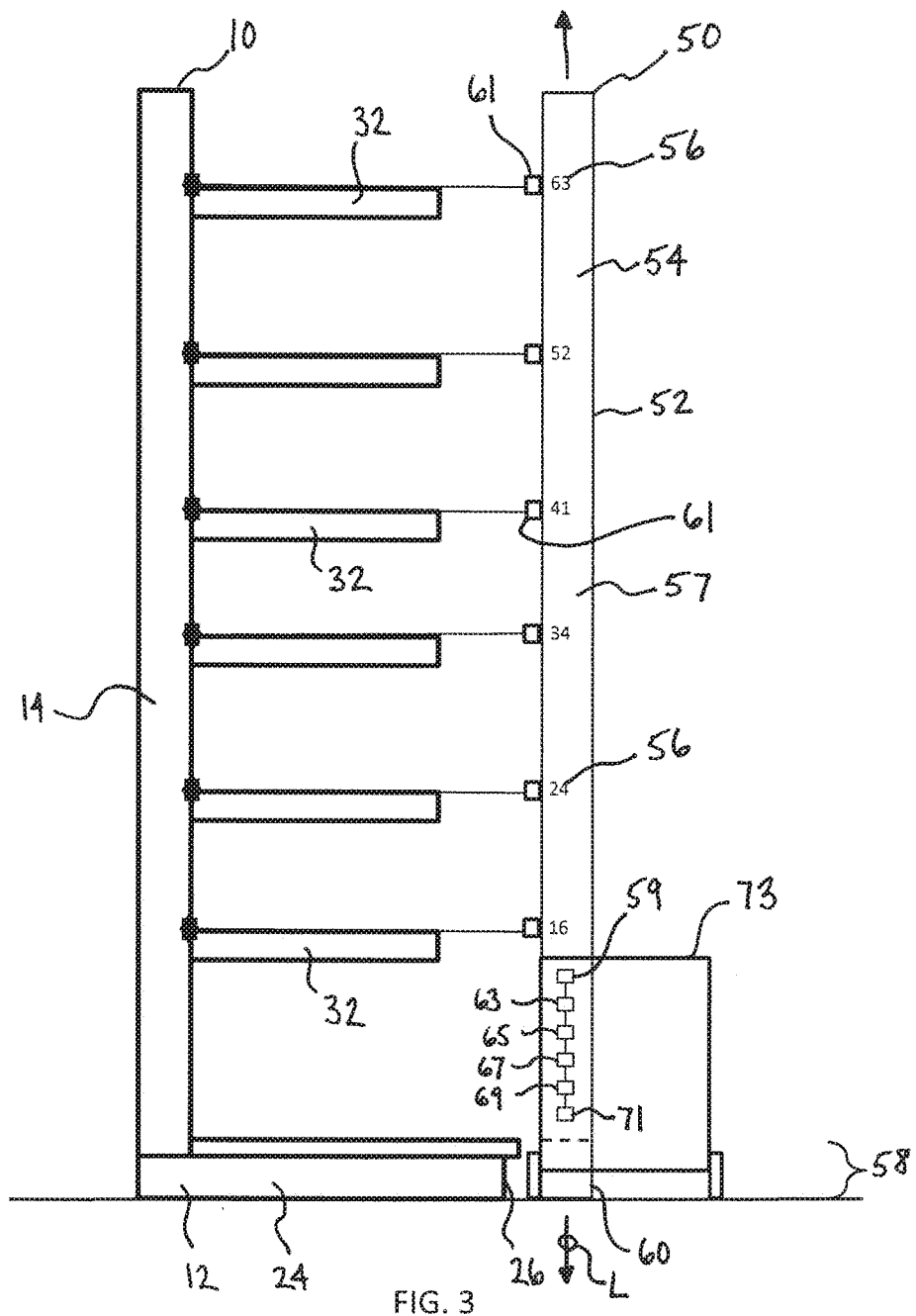
FIG. 3 is a diagrammatic view of a second embodiment of a shelf height measurement device in accordance with some embodiments.
Figure 4:
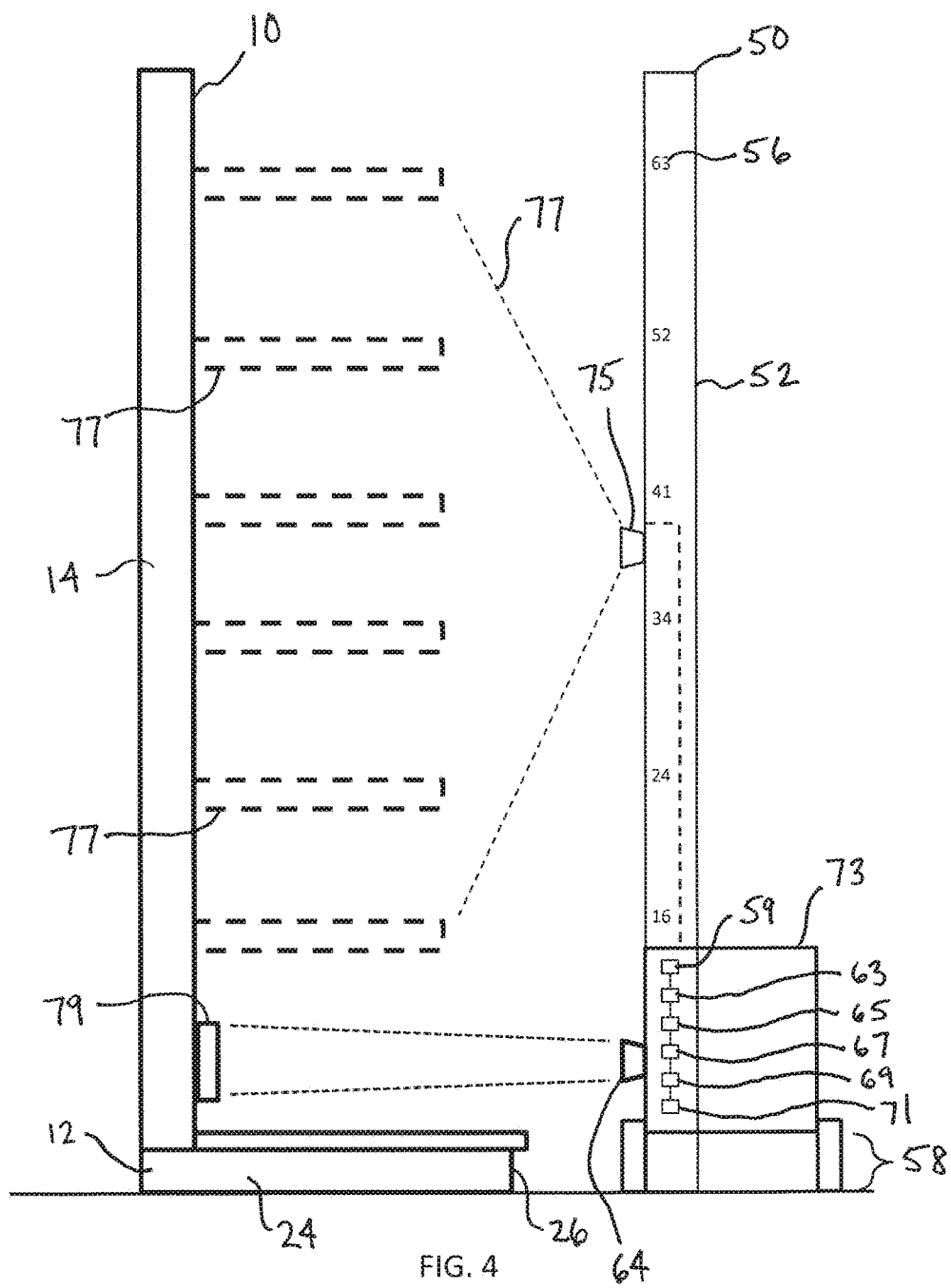
FIG. 4 is a diagrammatic view of a third embodiment of a shelf height measurement device in accordance with several embodiments.

A shelf height measurement device 50 configured to enable fast and easy identification of the shelf notches 28 on the shelving unit 10 is shown in FIGS. 2-4. The device 50 can be conveniently portable so that a user can carry the device 50 down an aisle as needed to both install shelves at correct heights and quickly determine whether shelves already mounted to a shelving unit are mounted at correct heights.

The device 50 includes an elongate measurement member 52 that extends along a longitudinal axis L, which can act as a handle for a user. The height of the measurement member 52 is preferably sized to be greater than or equal to the height of a shelving unit 12 so that the measurement member 52 can identify the height of all of the shelf notches 28 on the shelving unit 10. If desired, the measurement member 52 can be collapsible about one or more hinges 53, with portions of the measurement member 52 pivoting about the hinges 53 with respect to one another, so that the measurement member 52 can be stored in a compact configuration. By another approach, the measurement member 52 can be telescoping components, or other collapsible mechanism.

The measurement member 52 includes a front surface 54 with a plurality of shelf notch indicator portions 56 disposed vertically along a height thereof. The measurement member 52 is sized so that, when it is rested on the floor adjacent to the shelving unit 10, the indicator portions 56 horizontally align with the shelf notches 28 on the shelving unit 10.

In one form shown in FIG. 2, the indicator portions 56 can be physically marked on the front surface 54. Although lines are shown for the sake of simplicity, the indicator portions 56 can be individually numbered, or numbered at set intervals, such as every five portions, etc., to identify each shelf notch 28. For example, the bottommost notch 28 can be identified by the first indicator portion 56, the next notch 28 up can be identified by the second indicator portion 56, and the like. Alternatively, the topmost notch 28 can correspond to the "first" indicator portion 56, etc. The indicator portions 56 can be disposed on the front surface 54 by any suitable process, including, for example, printing, engraving, adhering, mounting using hardware, or the like.

As discussed above, the base portion 12 of the shelving unit 10 complicates the identification process of the shelf notches 28. Pursuant to this, the measurement member 52 includes an offset portion 58 disposed at a bottom 60 thereof. The offset portion 58 is preferably sized to have a height generally equal to a height of the base portion 12 of the shelving unit 10. The shelf notch indicator portions 56 begin above the offset portion 58 to correctly identify the heights of the shelf notches 28.

As shown in FIG. 1, the base portion 12 of the shelving unit 10 projects outwardly from the back wall 14 a significant distance to provide stability to the shelving unit 10. Unfortunately, this also sets the shelf notches 28 back from a front edge 36 of the base portion 12, making it difficult to easily identify shelf notch height from a vertical measurement member. Advantageously, the device 50 further includes a horizontal position indicator, which in one form can be an arm portion or member 62 that projects outwardly from the measurement member 52, such as generally transverse to the longitudinal axis L thereof. The arm 62 is movably mounted to the measurement member 52 so that a user can position and secure the arm 62 at a desired indicator portion 56. The arm 62 can secure to the measurement member 52 using any suitable mechanism, including, for example, a clamp, hardware, such as a screw or bolt, friction, a tongue and groove, or the like. So configured, a user can identify a desired indicator portion 56, slide or shift the arm 62 along the height of the measurement member 52 until the arm 62 aligns with the desired indicator portion 56, and secure the arm 62 in place. Then, the user can position the device 50 vertically adjacent to the shelving unit 10 with the arm 62 projecting toward the back wall 14 thereof so that the arm 62 visually identifies the desired indicator portion 56. By some embodiments, the arm 62 can be pivotably mounted to the measurement member 52 so that the arm 62 can be pivoted between a first, storage position or orientation extending along the measurement member 52, generally parallel to the longitudinal axis L thereof, and a second, use position or orientation projecting outwardly from the measurement member 52.

In another form shown in FIG. 3, the indicator portions 56 can be provided on a display 57 mounted on the front surface 54 of the measurement member 52. The display 57 can be an LCD or other electronic display. Contents of the display 57 can be configured by a suitable control circuit 59 mounted to or disposed within the measurement member 52. As such, the control circuit 59 can cause the display 57 to display the indicator portions 56 thereon for viewing by a user. The indicator portions 56 on the display 57 can be configured as set forth above, including marked, numbered, or combinations thereof.

The measurement member 52 of this form also includes a horizontal position indicator. By one approach, the measurement member 52 can include an arm 62 as set forth above. By another approach, the measurement member 52 of this form can include one or more laser or light devices 61 disposed thereon acting as the arm 62 to visually identify an indicator portion 56. The laser devices 61 are configured to project a controlled beam of illumination outwardly from the measurement member 52 in a horizontal direction to illuminate the shelving unit 10 at a desired height corresponding to a desired shelf notch 28.

In one form, the measurement member 52 can have one laser device 61 that can be slidably moved along the height of the measurement member 52, similarly to the configuration of the arm 62 discussed above. In another form, the measurement member can include a plurality of laser devices 61, such as corresponding to the number of shelves 32 mounted, or to be mounted, to the shelving unit 10. If desired, the laser devices 61 can be removably mounted to the measurement member 52 so that a user can set a desired number at desired heights. In a further form, the measurement member 52 can include the same number of laser devices 61 as indicator portions 56.

By some approaches, the control circuit 59 can control operation of the laser devices 61. In one form, the control circuit 59 can control operation of the laser devices 61 based on instructions received from a user input 63, which can be one or more buttons, a touch screen, or the like. So configured, a user can indicate desired indicator portions 56 and the control circuit 59 can cause the desired laser devices 61 to illuminate. A user can then position the measurement member 52 next to the shelving unit 10 and the desired laser devices 61 will illuminate the corresponding shelf notches 28.

By further approaches, the measurement member 52 can also include a memory 65, a receiver 67, optionally a transmitter 69, and a power source 71 operably coupled to the control circuit 59. So configured, the measurement member 52 can receive a shelving plan from an external source through the receiver 67 and activate the laser devices 61 identified in the shelving plan. The control circuit 59 can also cause the display 57 to display or highlight the indicator portions 56 corresponding to the shelving plan. This configuration allows a user to upload a shelving plan corresponding to a desired aisle location and walk down the aisle with the measurement member 52 held adjacent to the shelving unit in a vertical orientation such that the laser devices 61 illuminate the shelf notches 28 corresponding to the shelving plan.

In some embodiments, the device 50 can further include an electronic imager or scanning device 64, such as a camera device, mounted thereto. The electronic imager or scanning device 64 is configured to collect location information for the shelving unit to thereby identify the geographic location of the shelving unit 10 within the store. The location information can be utilized for virtual mapping and data confirmation/validation via communications with to a central control circuit 88, as described in more detail below.

In one form, the camera device 64 is mounted to the arm 62 and oriented to capture an image that includes modular shelf identification information, such as the desired indicator portion 56 and location information about the shelving unit 10. For example, the location information can include an aisle number, a shelf number, a product, a product label and/or barcode, or the like. As such, the image provides documentation as to shelf height and location in the store. The documentation can aid users in correcting any problems and providing a file of compliance. The modular shelf identification information can further include the shelf 32 or shelf notch 28 oriented alongside the desired indicator portion 56. Further, the shelving unit 10 can include notch identification labels or portions 65 adjacent to each of the shelf notches 28. The labels 65 can be disposed inwardly or outwardly of the shelf notches 28 as desired. So configured, after an associate mounts the shelves 32 to the back wall 14, the associate can take a picture of the assembled shelving unit 10 with the identification labels 65 in view to validate that the shelving unit 10 was assembled correctly according to plan.

In one form, the camera device 64 can be mounted to the measurement member 52 to be controlled by the control circuit 59. In another form, the scanning device 64, whether mounted to the measurement member 52 or the arm 62, is oriented to scan a label 79 or other scannable portion of the shelving unit 10 that identifies or points to the location information to verify a location of the shelving unit 10. The label 79 can be mounted to the back wall 14 or other desired portion of the shelving unit 10. The label 79 can have alphanumeric information thereon, a machine-readable code, and so forth.

If desired, the measurement member 52 can be mounted or otherwise attached to a robot 73 that is configured to move down an aisle or other location within a store forwardly of the shelving unit 10. The robot 73 advantageously positions the measurement member 52 adjacent to the shelving unit 10 so that an associate can utilize the member 52, as discussed herein, to identify the planned shelf notches 28 or confirm that the shelves 32 mounted thereto are mounted to the correct shelf notches 28. Any of the measurement member 52 embodiments described herein can be utilized with the robot 73 to advantageously provide hands-free use. The robot 73 can be operated by a user or be configured to operate autonomously, as desired.

By a further approach, as shown in FIG. 4, the robot 73 or measurement member 52 can include a projector 75 mounted thereto. The projector 75 can be configured to project an image or hologram 77 onto an adjacent shelving unit 10, and the back wall 14 thereof, to thereby show where the shelves 32 should be mounted. The image or hologram 77 can highlight the planned mounting structures 28 with separate shapes, a box intended to represent a shelf, and a hologram of the shelf 32. To achieve a desired orientation, the robot 73 or measurement member 52 can include the offset portion 58 so that the projector 75 aligns with the shelving unit 10 at a desired height. The robot 73 or measurement member 52 can be positioned at a predetermined distance from the base deck 24 so that the image or hologram 77 is correctly aligned with the shelving unit 10. By another approach, the robot 73 or measurement member 52 can include a distance sensor to determine a distance to the shelving unit 10 to thereby adjust the projector 75 and the image or hologram 77 projected therefrom so that it is accurate for the measured distance.

The user can then either mount the shelves 32 to the shelving unit 10 aligned with the image or can confirm that the shelves 32 were correctly installed. As shown, the robot 73, or measurement member 52, can include the memory 65, the receiver 67, optionally the transmitter 69, and the power source 71 operably coupled to the control circuit 59. So configured, the robot 73, or measurement member 52, can receive a shelving plan from an external source through the receiver 67 and operate the projector 75 so that the image identifies the shelf notches 32 identified in the shelving plan. This configuration allows a user to upload a shelving plan corresponding to a desired aisle location and walk down the aisle near the robot 73 or carrying the measurement member 52 to install shelving 32 or confirm that shelving 32 was installed according to the shelving plan.

Figure 5:
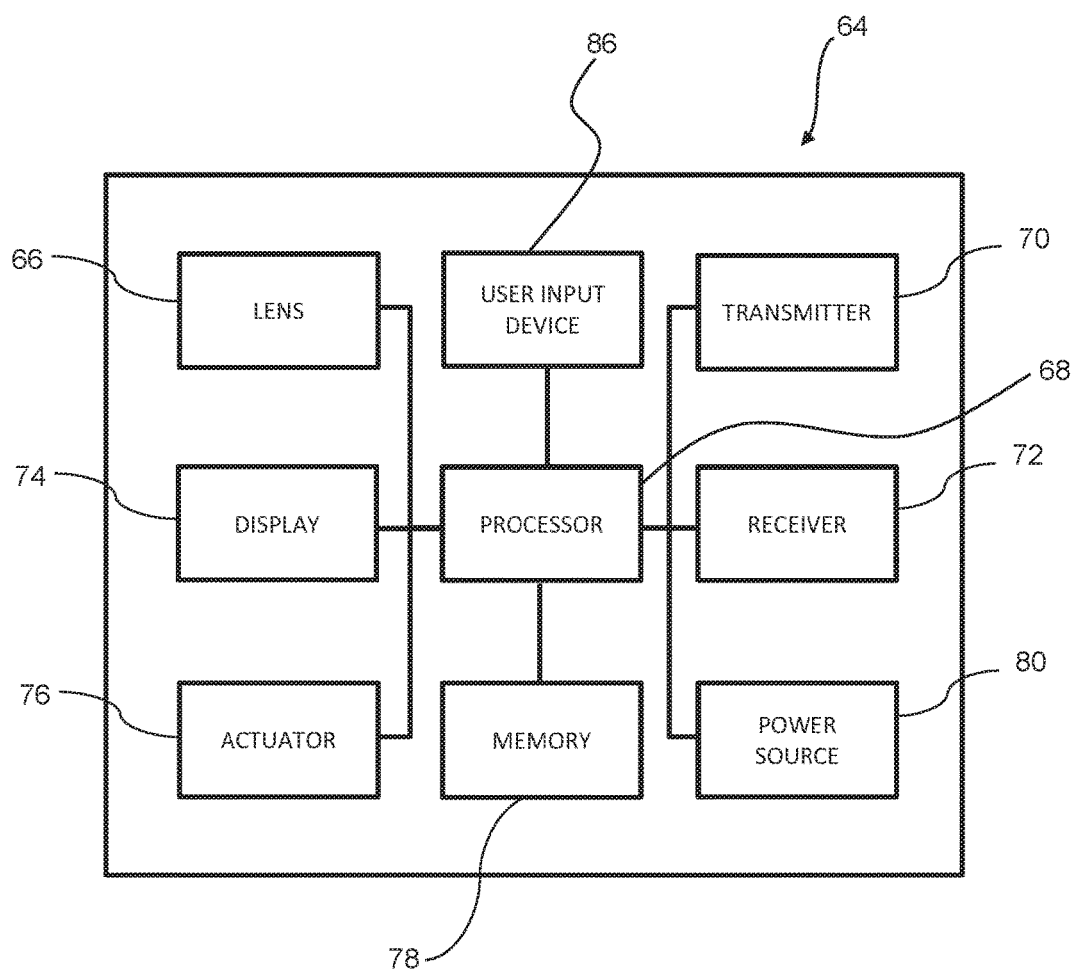
FIG. 5 is a diagrammatic view of a camera device in accordance with some embodiments.

As shown in FIG. 5, in the form of a separate camera device 64, the separate camera device 64 can be a separate computing device including a lens 66, a control circuit 68, a transmitter 70, an optional receiver 72, an optional display 74, an actuator 76 to control operation of the camera device 64, a memory 78 for locally storing images and/or other media captured by the camera device 64, and a power source 80 providing power to the camera device 64. The components of the camera device 64 can be disposed in a single housing 82.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuits described herein may be configured (for example, by using corresponding programming stored in a memory as will be well understood by those skilled in the art) to carry out one or more of the steps, actions, and/or functions described herein In addition, or instead of the actuator 76, the camera device 64 can include a remote actuator 84 configured to control operation of the camera device 64. The remote actuator 84 can be wired to communicate with the controller 68 or can communicate wirelessly therewith, such as through near field communication, Bluetooth, WiFi, or the like. As shown in FIG. 2, the remote actuator 84 can be mounted to the measurement member 52 so that the device 50 can be operated with a single hand, i.e., by actuating the remote actuator 84 with the hand gripping and positioning the device adjacent to the shelving unit 10.

Figure 6:
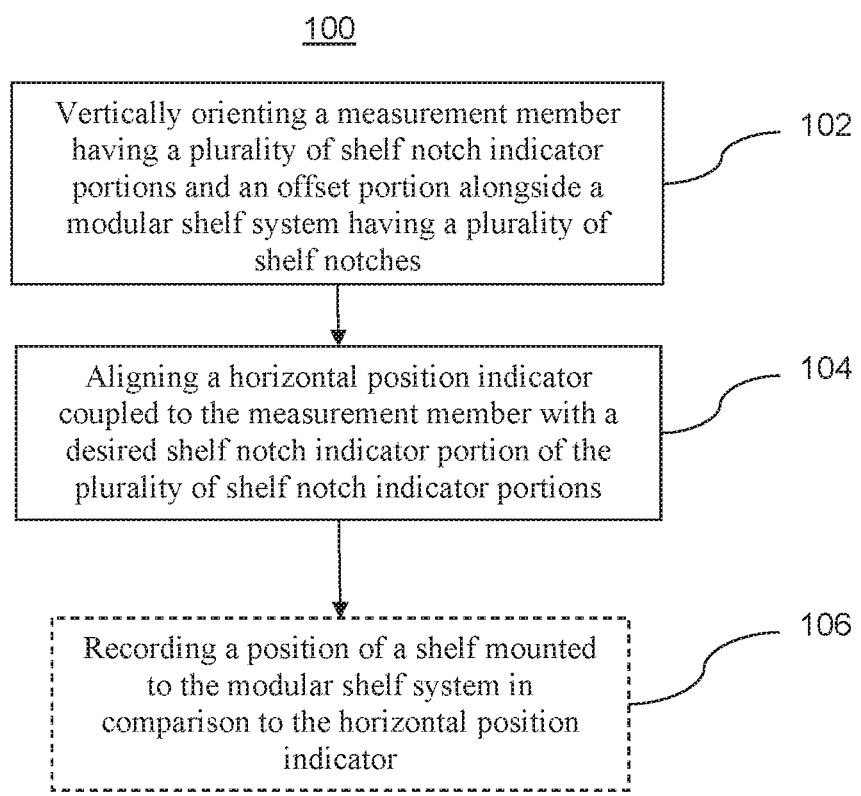
FIG. 6 is a flowchart in accordance with several embodiments.

So configured, as shown in FIG. 6, the measurement device 50 can be utilized to verify 100 the height of shelves 32 that are already installed on the shelving unit 10. To verify 100 the height of a shelf 32 mounted to the shelving unit 10, a user vertically orients 102 the measurement member 52 alongside the shelving unit 10 in a generally vertical orientation. The user aligns 104 the horizontal position indicator, which can be the arm 62 or one or more laser devices 61 discussed above, with a desired indicator portion 56. In one form, a user can vertically move the horizontal position indicator along the measurement member 52 until it aligns with a desired indicator portion 56, which corresponds to a predetermined shelf height, and secures the horizontal position indicator to the measurement member 52. In another form, the user can cause the control circuit to operate horizontal position indicators that align with desired indicator portions 56. As shown in FIG. 5, the user can then optionally record 106 the position of the shelf 32 in comparison to the horizontal position indicator. Accordingly, if the shelf 32 and the horizontal position indicator align, the shelf 32 is mounted to the correct shelf notch 28 and if the shelf 32 and the horizontal position indicator are misaligned, the shelf 32 was incorrectly mounted to the shelving unit 10. Accordingly, the device 50 can be used to double check installation and confirm compliance with predetermined plans.

Figure 7:
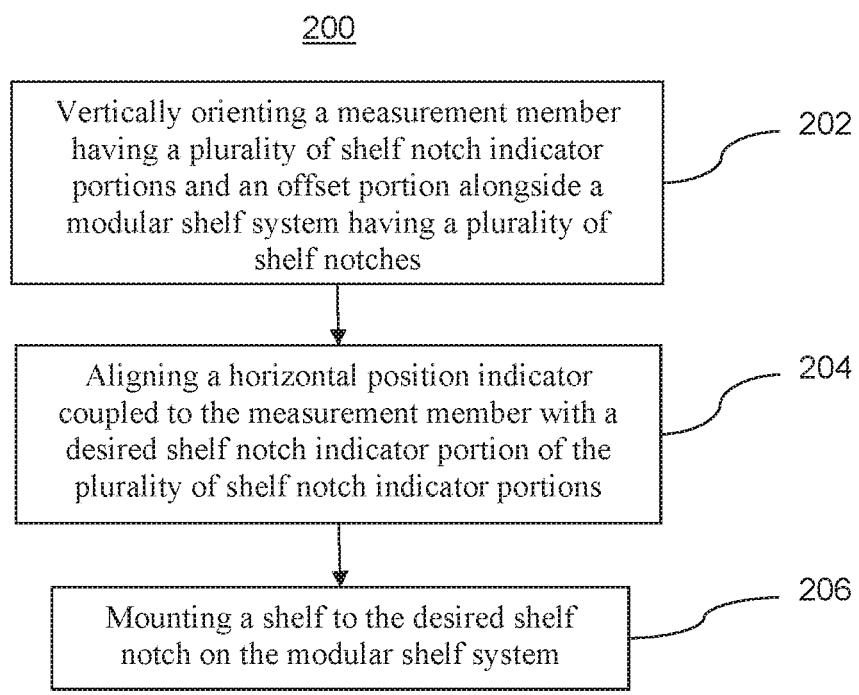
FIG. 7 is a flowchart in accordance with some embodiments.

The device 50 can also be used during installation 200. As shown in FIG. 7, a user vertically orients 202 the measurement member 52 alongside the shelving unit 10 in a generally vertical orientation. The user aligns 204 the horizontal position indicator, which can be the arm 62 or the one or more laser devices 61 discussed above, with a desired indicator portion 56, which corresponds to a predetermined shelf height. In one form, the user can vertically move the horizontal position indicator until it aligns with a desired indicator portion 56 and secure the horizontal position indicator to the measurement member 52. In another form, the user can cause the control circuit to operate horizontal position indicators that align with desired indicator portions 56. The user can then utilize the measurement member 52 and the horizontal position indicator to identify a correct shelf notch 28 and mount 206 the shelf 32 to the identified shelf notch 28, which can correspond to a predetermined plan. As such, an installer need not count the shelf notches 28 on the shelving unit 10 to determine a correct notch or utilize a product that will be stocked on the shelf to determine a shelf height, which can result in shelving heights that do not conform to predetermined plans.

As shown in FIG. 5, the camera device 64 can further include a user input device 86, such as a touch screen, button, switch, or the like. A user can utilize the user input 86 to manage storage of the images in the memory 78 and/or transmit stored images to a remote, central control circuit 88 via any desired communication network 90, including near field communication, Bluetooth, WiFi, radio, a cellular network, or the like, which can be a central depository for images. As such, a central authority can compile images of assembly validation and/or shelf compliance, whether in a single location or across several locations. More specifically, after a user installs the shelves 32 on the shelving unit 10 using the device 50, the images or scanning information transmitted to the central control circuit 88 can be utilized to validate that the shelving unit 10 was correctly installed. Eventually, the central control circuit 88 can compile images or scans for most or all of the shelving units 10 within the store to ensure compliance with the shelving plan. In some embodiments, the user input 86 can be utilized to add data to an image, such as a caption or file name to add additional identification information to the file, such as location information, a date, a time, planogram information, or the like.

In some embodiments, an apparatus for identifying shelf notches in a modular shelf system as described herein includes a measurement member having a longitudinal axis and that is configured to be oriented with the longitudinal axis generally vertical. The measurement member includes a bottom offset portion that has a height generally equal to a base of the modular shelf system below the shelf notches thereof. The measurement member further includes a plurality of shelf notch indicator portions disposed along a height thereof above the bottom offset portion and along the longitudinal axis. The shelf notch indicator portions are configured to horizontally align with the shelf notches of the modular shelf system to provide a visual reference for a user. The apparatus further includes horizontal position indicator that is coupled to the measurement member configured to project outwardly therefrom generally orthogonal to the longitudinal axis. The horizontal position indicator is configured to align with a desired shelf notch indicator portion and project outwardly towards the modular shelf system to provide a visual indication of a desired shelf notch on the modular shelf system.

In further embodiments, the horizontal position indicator can be an arm member movably mounted to the measurement member and the apparatus can include a camera device mounted to the arm member and oriented to capture images including the desired shelf notch indicator portion and location information about the modular shelf system. The camera device can further be oriented to capture images including the desired shelf notch or a shelf mounted thereto.

In other embodiments, the horizontal position indicator can be one or more laser devices. By a further approach, the plurality of shelf notch indicator portions can be displayed on a display mounted to the measurement member. By yet another approach, the measurement member can include a receiver and a control circuit controlling operation of the display, the laser devices, and the receiver. In this approach, the control circuit can be configured to receive a shelving plan from the receiver, display shelf notch indicator portions identified in the shelving plan on the display, and illuminate the laser devices that align with the shelf notch indicator portions identified in the shelving plan.

In some embodiments, a method for verifying a height of a shelf mounted to shelf notches in a modular shelf system as described herein includes vertically orienting a measurement member having a longitudinal axis alongside the modular shelf system. The measurement member can include a bottom offset portion having a height generally equal to a base of the modular shelf system below the shelf notches thereof and a plurality of shelf notch indicator portions disposed along a height of the measurement member above the bottom offset portion, where the shelf notch indicator portions are configured to horizontally align with the shelf notches of the modular shelf system. The method further includes aligning a horizontal position indicator coupled to the measurement member with a desired shelf notch indicator portion of the plurality of shelf notch indicator portions. The horizontal position indicator can be configured to project outwardly towards the modular shelf system to provide a visual indication of a desired shelf notch of the modular shelf system In further embodiments, the method can include recording the position of the shelf mounted to the modular shelf system in comparison to the horizontal position indicator. By one approach, recording the position can include capturing an image of the shelf and the horizontal position indicator with a camera device.

In further embodiments, the horizontal position indicator can be one or more laser devices, and the measurement member can includes a display configured to display the plurality of shelf notch indicator portions, a receiver, and a control circuit controlling operation of the display, the laser devices, and the receiver. By this approach, aligning the horizontal position indicator with the desired shelf notch indicator portion can include the control circuit receiving a shelving plan from the receiver, displaying shelf notch indicator portions identified in the shelving plan, and illuminating the laser devices that align with the shelf notch indicator portions identified in the shelving plan.

In some embodiments, a method for mounting shelves to shelf notches at predetermined heights in a modular shelf system as described herein includes vertically orienting a measurement member having a longitudinal axis alongside the modular shelf system. The measurement member includes a bottom offset portion having a height generally equal to a base of the modular shelf system below the shelf notches thereof and a plurality of shelf notch indicator portions disposed along a height of the measurement member above the bottom offset portion, where the shelf notch indicator portions are configured to horizontally align with the shelf notches of the modular shelf system. The method can further include aligning a horizontal position indicator coupled to the measurement member with a desired shelf notch indicator portion of the plurality of shelf notch indicator portions, where the horizontal position indicator is configured to project outwardly towards the modular shelf system to provide a visual indication of a desired shelf notch of the modular shelf system. The method can then include mounting a shelf to the desired shelf notch on the modular shelf system.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An apparatus for identifying shelf notches in a modular shelf system, the apparatus comprising:
   a measurement member having a longitudinal axis and configured to be oriented with the longitudinal axis generally vertical, the measurement member including a bottom offset portion having a height generally equal to a base of the modular shelf system below the shelf notches thereof;
   a plurality of shelf notch indicator portions disposed along a height of the measurement member above the bottom offset portion along the longitudinal axis thereof, the shelf notch indicator portions configured to horizontally align with the shelf notches of the modular shelf system; and
   a horizontal position indicator coupled to the measurement member and configured to project outwardly therefrom generally orthogonal to the longitudinal axis, the horizontal position indicator further configured to align with a desired shelf notch indicator portion and project outwardly towards the modular shelf system to provide a visual indication of a desired shelf notch on the modular shelf system, wherein the horizontal position indicator comprises one or more laser devices;
   wherein the plurality of shelf notch indicator portions are displayed on a display mounted to the measurement member;
   wherein the measurement member further comprises a receiver and a control circuit controlling operation of the display, the laser devices, and the receiver; and
   wherein the control circuit is configured to receive a shelving plan from the receiver, display shelf notch indicator portions identified in the shelving plan on the display, and illuminate the laser devices that align with the shelf notch indicator portions identified in the shelving plan.

2. A method for verifying a height of a shelf mounted to shelf notches in a modular shelf system, the method comprising:
   vertically orienting a measurement member having a longitudinal axis alongside the modular shelf system, the measurement member including a bottom offset portion having a height generally equal to a base of the modular shelf system below the shelf notches thereof and a plurality of shelf notch indicator portions disposed along a height of the measurement member above the bottom offset portion, the shelf notch indicator portions configured to horizontally align with the shelf notches of the modular shelf system; and
   aligning a horizontal position indicator coupled to the measurement member with a desired shelf notch indicator portion of the plurality of shelf notch indicator portions, the horizontal position indicator configured to project outwardly towards the modular shelf system to provide a visual indication of a desired shelf notch of the modular shelf system,
   wherein the horizontal position indicator comprises one or more laser devices, the measurement member includes a display configured to display the plurality of shelf notch indicator portions, a receiver, and a control circuit controlling operation of the display, the laser devices, and the receiver; and wherein aligning the horizontal position indicator with the desired shelf notch indicator portion comprises the control circuit receiving a shelving plan from the receiver, displaying shelf notch indicator portions identified in the shelving plan, and illuminating the laser devices that align with the shelf notch indicator portions identified in the shelving plan.

* * * * *